(12) United States Patent
Cho et al.

(10) Patent No.: US 6,837,619 B2  
(45) Date of Patent: Jan. 4, 2005

(54) FURNACE TEMPERATURE DETECTOR

(75) Inventors: Seong-Ho Cho, Suwon (KR); Sang-Kook Choi, Suwon (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 0 days.

(21) Appl. No.: 10/442,143

(22) Filed: May 21, 2003

(65) Prior Publication Data

US 2004/0004993 A1 Jan. 8, 2004

(30) Foreign Application Priority Data

Jul. 4, 2002 (KR) ................................. 10-2002-0038712

(51) Int. Cl.⁷ .......................... G01K 3/06; G01K 3/08; G01K 3/14; G01K 1/14; G01K 7/02
(52) U.S. Cl. ....................... 374/163; 374/112; 374/30; 374/208; 374/179
(58) Field of Search ................................ 374/163, 179, 374/208, 34, 137, 112, 29, 30

(56) References Cited

U.S. PATENT DOCUMENTS

| | | | | |
|---|---|---|---|---|
| 3,593,577 A | * | 7/1971 | Monner | 374/34 |
| 4,130,016 A | * | 12/1978 | Walker | 374/34 |
| 4,380,814 A | * | 4/1983 | Shinmyo | 375/267 |
| 4,439,048 A | * | 3/1984 | Townsend et al. | 374/34 |
| 4,562,037 A | * | 12/1985 | Panayotou et al. | 376/340 |
| 4,875,042 A | * | 10/1989 | Oku et al. | 340/870.17 |
| 5,001,327 A | * | 3/1991 | Hirasawa et al. | 219/390 |
| 5,261,747 A | * | 11/1993 | Deacutis et al. | 374/137 |
| 5,496,450 A | * | 3/1996 | Blumenthal et al. | 205/782 |
| 6,207,937 B1 | * | 3/2001 | Stoddard et al. | 219/497 |
| 6,441,350 B1 | * | 8/2002 | Stoddard et al. | 219/497 |
| 2002/0055080 A1 | * | 5/2002 | Tanaka et al. | 432/49 |

* cited by examiner

*Primary Examiner*—Gail Verbitsky  
(74) *Attorney, Agent, or Firm*—Lee & Sterba, P.C.

(57) ABSTRACT

A furnace temperature detector includes a spike thermocouple attached to a heating chamber; an overheat thermocouple attached to the heating chamber; an inner thermocouple installed inside a reaction tube; a temperature controller connected to the spike thermocouple and the inner thermocouple; an overheat controller connected the overheat thermocouple; and a control switch for directing the output line of the overheat thermocouple. When the furnace overheats, the overheat thermocouple detects the overheating and generates and outputs an electric signal corresponding to the overheating to the overheat controller; the overheat controller generates and outputs an overheat control signal. When the furnace is operating normally, the overheat thermocouple detects a furnace temperature and generates and outputs an electric signal corresponding to the temperature to the control switch; the control switch directs the output line of the overheat thermocouple to the temperature controller; the temperature controller generates and outputs a temperature control signal.

6 Claims, 3 Drawing Sheets

FURNACE TEMPERATURE DETECTOR

BACKGROUND OF THE INVENTION

1. Field of the Invention

The present invention relates to a furnace temperature detector used in a low-pressure chemical vapor deposition (LPCVD) or a low-pressure thermal treatment process. More particularly, the present invention relates to a furnace temperature detector for detecting a furnace temperature using an overheat thermocouple when an external thermocouple may become defective.

2. Description of the Related Art

Generally, a furnace for fabricating a semiconductor memory device uses various types of thermocouples to control or confirm the temperature of the furnace. An exemplary thermocouple includes an external thermocouple (also referred to as a spike thermocouple), an inner thermocouple, and an overheat thermocouple. To confirm and control the temperature of the furnace, the spike thermocouple shares a single temperature controller with the inner thermocouple.

FIG. 1 illustrates a schematic view of an exemplary furnace. The exemplary furnace includes a reaction tube 1, a heating chamber 3, inner thermocouples 5-1 to 5-4, spike thermocouples 7-1 to 7-4, and overheat thermocouples 9-1 to 9-4. In operation, wafers are reacted with a reaction gas in the reaction tube 1, and the heating chamber 3 supplies heat energy to the reaction tube 1. During operation, the inner thermocouples 5-1 to 5-4 detect the temperature in the reaction tube 1, the spike thermocouples 7-1 to 7-4 detect the temperature of the heating chamber 3, and the overheat thermocouples 9-1 to 9-4 detect an overheating state of the heating chamber 3. In general, a thermocouple is composed of two different metal materials or two different semiconductor materials, which are in contact with each other at two points. Therefore, the thermocouple generates an electromotive force when the temperatures of the two contact points are different. Accordingly, the thermocouple is able to detect a temperature using the electromotive force.

FIG. 2 is a block diagram of a conventional temperature detector for detecting a furnace temperature that includes a temperature controller 14 and an overheat controller 15. The conventional temperature detector of FIG. 2 may be incorporated in the exemplary furnace of FIG. 1. In operation, the temperature controller 14 receives an electric signal (i.e., the electromotive force) from the spike thermocouple 11 (7-1 to 7-4 of FIG. 1) and the inner thermocouple 12 (5-1 to 5-4 of FIG. 1) to generate a temperature control signal TC. The overheat controller 15 receives an electric signal (the electromotive force) from the overheat thermocouple 13 (9-1 to 9-4 of FIG. 1) to generate an overheat control signal OHC.

As shown in FIGS. 1 and 2, in a conventional temperature detector incorporated into an exemplary furnace, the spike thermocouple 11 and the inner thermocouple 12 control the temperature of the furnace, and the overheat thermocouple 13 interrupts the power when the furnace reaches an overheated state. In low-pressure chemical vapor deposition (LPCVD) equipment or low-pressure heat treatment equipment, however, it is difficult to use an inner thermocouple because of the structure of the equipment and due to the characteristics of the process. More particularly, the reaction gas becomes deposited on the surface of the inner thermocouple 12 during the LPCVD process. Thus, it is difficult to detect the temperature of the reaction tube (1 of FIG. 1) accurately.

Accordingly, in a LPCVD process or a low-pressure heat treatment process, the inner thermocouple 12 is used only to profile (i.e., initially check) the temperature of the reaction tube (1 of FIG. 1) before the reaction gas is injected into the reaction tube. Once the reaction gas is injected and the reaction begins, the inner thermocouple 12 is no longer used. In addition, even though the spike thermocouple 11 is attached to the heating chamber (3 of FIG. 1), the spike thermocouple may become damaged when the reaction tube (1 of FIG. 1) is inserted into the heating chamber (3 of FIG. 1) or the reaction tube (1 of FIG. 1) is withdrawn from the heating chamber (3 of FIG. 1). In the event that the spike thermocouple 11 is damaged, an accurate temperature measurement is not taken.

Therefore, due to the damage to the spike thermocouple, the temperature of the furnace may not be measured and controlled accurately. This inability to measure and control furnace temperature accurately may lead to a low yield of the semiconductor devices being formed on semiconductor wafers, which are processed inside the furnace.

SUMMARY OF THE INVENTION

It is therefore a feature of the present invention to provide a furnace temperature detector using an overheat thermocouple to detect the temperature of the furnace, when the spike thermocouple becomes defective. To provide the feature, the present invention provides a furnace temperature detector including a spike thermocouple attached to a heating chamber; an overheat thermocouple attached to the heating chamber; an inner thermocouple installed inside a reaction tube surrounded by the heating chamber; a temperature controller connected to an output line of the spike thermocouple and an output line of the inner thermocouple; an overheat controller connected to an output line of the overheat thermocouple; and a control switch for directing the output line of the overheat thermocouple, wherein: when the furnace is operating in an overheating state, the overheat thermocouple detects the overheating state of the furnace and generates and outputs an electric signal corresponding to the overheating state of the furnace to the overheat controller, and the overheat controller generates and outputs an overheat control signal; and when the furnace is operating without reaching the overheating state, the overheat thermocouple detects a furnace temperature and generates and outputs an electric signal corresponding to the furnace temperature to the control switch, the control switch directs the output line of the overheat thermocouple to the temperature controller, and the temperature controller generates and outputs a temperature control signal.

The reaction tube and the heating chamber may have multiple zones. In that case, each zone has installed therein a spike thermocouple, an inner thermocouple, and an overheat thermocouple.

According to a preferred embodiment of the present invention, a furnace temperature detector includes a spike thermocouple for detecting a temperature of a heating chamber; an inner thermocouple for detecting a temperature in a reaction tube surrounded by the heating chamber; a temperature controller for receiving an electric signal from the spike thermocouple and the inner thermocouple, and for generating a temperature control signal; an overheat thermocouple for detecting an overheating state of the heat chamber; an overheat controller for receiving an electric signal from the overheat thermocouple, and for generating an overheat control signal; and a control switch interposed between an output line of the overheat thermocouple and an output line of the inner thermocouple.

Referring to FIG. 4, an exemplary heating chamber has four zones. Accordingly, in this case, four overheat thermocouples are installed at a wall of the heating chamber. Generally, each thermocouple has two outputs. Therefore, eight output lines OHZ1-1, OHZ1-2, OHZ2-1, OHZ2-2, OHZ3-1, OHZ3-2, OHZ4-1, and OHZ4-2 from the four overheat thermocouples are connected to the control switch 26. As shown in FIG. 4, the control switch 26 receives the output lines OHZ1-1 to OHZ4-2. The control switch has a first group of eight output lines connected to the Preferably, the control switch disconnects the output line of the overheat thermocouple from the output line of the inner thermocouple when profiling the temperature of the reaction tube; and the control switch connects the output line of the overheat thermocouple to the output line of the inner thermocouple when a reaction process is performed inside the reaction tube. The control switch is preferably a relay switch.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

Korean Patent Application No. 2002-38712, filed on Jul. 4, 2002, and entitled: "Furnace Temperature Detector," is incorporated by reference herein in its entirety.

The present invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
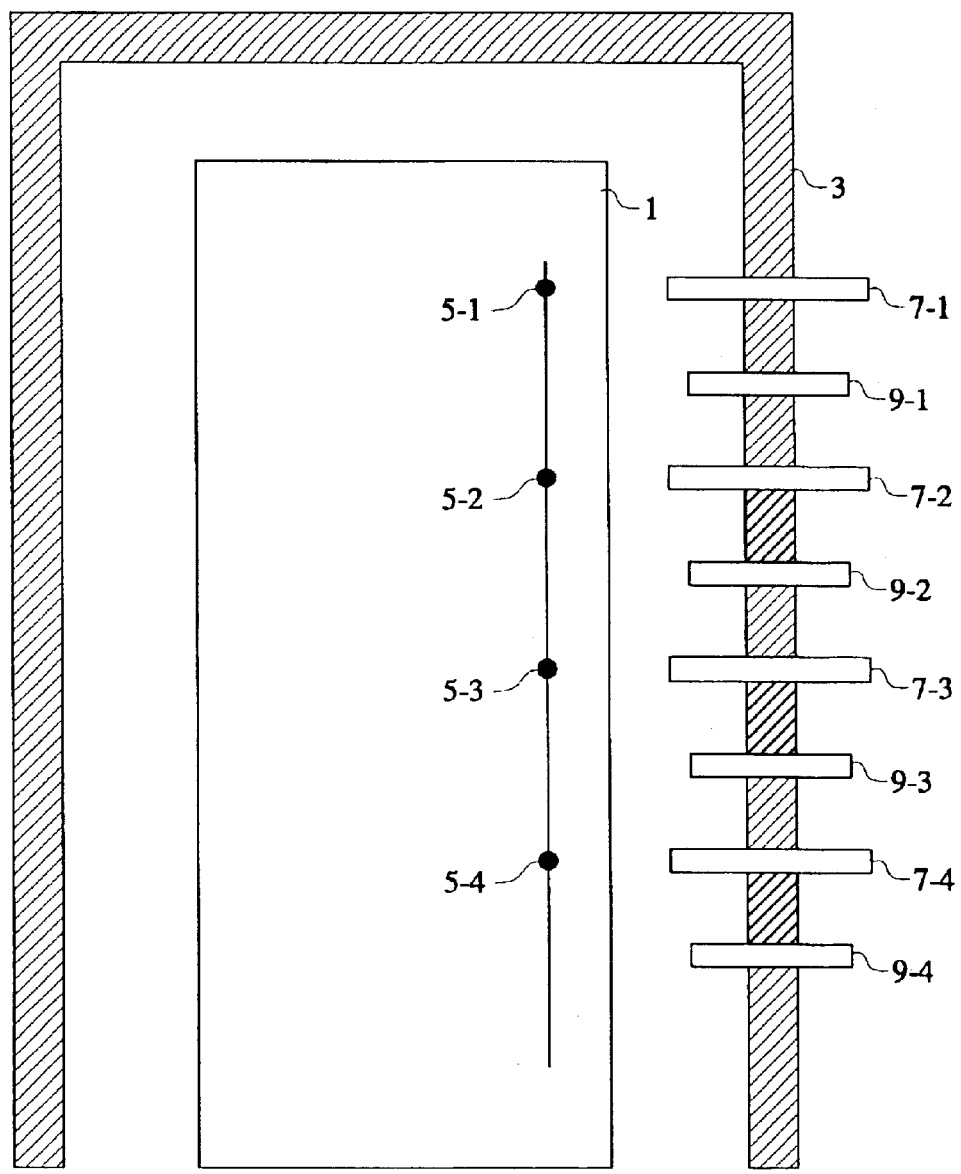
FIG. 1 illustrates a schematic view of an exemplary furnace.
Figure 2:
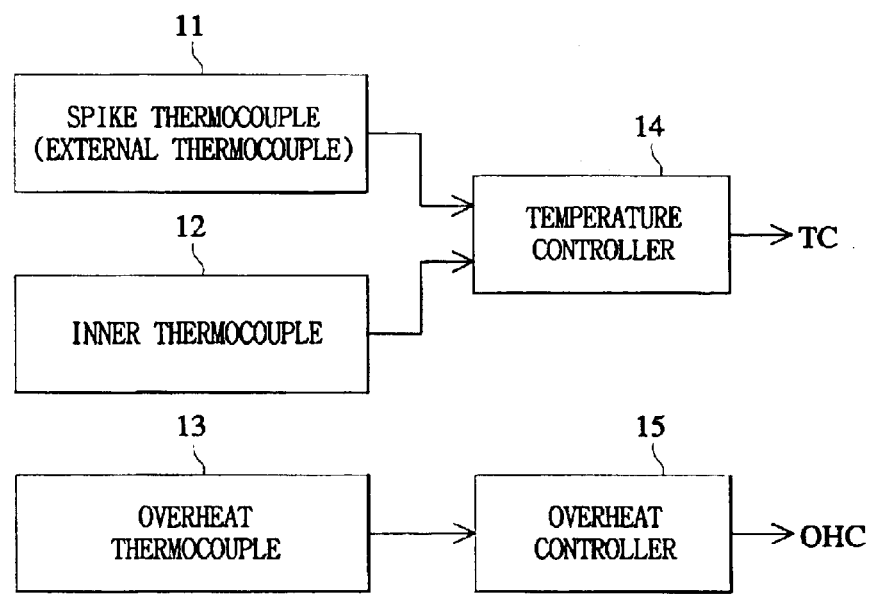
FIG. 2 is a block diagram of a conventional temperature detector, which may be incorporated into the exemplary furnace of FIG. 1.
Figure 3:
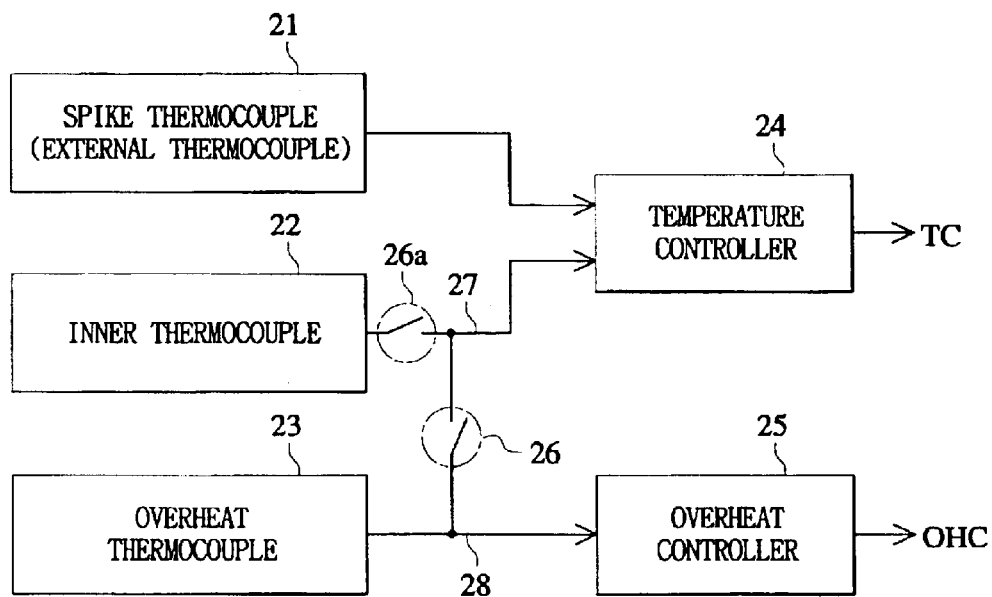
FIG. 3 is a block diagram of a furnace temperature detector according to a preferred embodiment of the present invention, which may be incorporated into the exemplary furnace of FIG. 1.

FIG. 3 is a block diagram of a furnace temperature detector according to a preferred embodiment of the present invention, which may be incorporated into the exemplary furnace of FIG. 1.

Referring to FIG. 3, a furnace temperature detector includes a spike thermocouple (i.e., an external thermocouple) 21, an inner thermocouple 22, a temperature controller 24, an overheat thermocouple 23, an overheat controller 25, and a control switch 26. In an embodiment of the present invention, a spike thermocouple 21, an inner thermocouple 22, and an overheat thermocouple 23 may represent a plurality of spike thermocouples 21, a plurality of inner thermocouples 22, and a plurality of overheat thermocouples 23, respectively. In a preferred embodiment of the present invention, there are a plurality of spike thermocouples 21, a plurality of inner thermocouples 22, and a plurality of overheat thermocouples 23.

In an embodiment of the present invention, spike thermocouples 21 and overheat thermocouples 23 are attached to a wall of the heating chamber (3 of FIG. 1). In operation, the spike thermocouples 21 detect a temperature of the heating chamber and the overheat thermocouples 23 detect an overheating state of the heating chamber. The inner thermocouples 22 are installed inside the reaction tube (1 of FIG. 1). The inner thermocouples 22 detect the temperature in the reaction tube. The temperature controller 24 receives electric signals based on the electromotive forces from the spike thermocouples 21 and the inner thermocouples 22 to generate a temperature control signal TC, and the overheat controller 25 receives electric signals based on electromotive forces from the overheat thermocouples 23 to generate an overheat control signal OHC. The control switch 26 is interposed between the output lines 27 of the inner thermocouples 22 and the output lines 28 of the overheat thermocouples 23. Preferably, the control switch is a relay switch.

Operation of a furnace temperature detector according to a preferred embodiment of the present invention will now be described.

As shown in FIG. 1, the reaction tube 1 and the heating chamber 3 may have multiple zones. In the case of multiple zones, one of the plurality of inner thermocouples, one of the plurality of spike thermocouples and one of the plurality of overheat thermocouples are each preferably installed in every zone of the reaction tube and the heating chamber.

Referring to FIGS. 1 and 3, the spike thermocouples 21 detect the temperature of the heating chamber 3 and output electromotive forces as electric signals. The electric signals from the spike thermocouples 21 are transmitted to the temperature controller 24. Similarly, the inner thermocouples 22 detect the temperature of the reaction tube 1 and output electromotive forces as electric signals. The electric signals from the inner thermocouples 22 are transmitted to the temperature controller 24.

The temperature controller 24 generates the temperature control signal TC. The temperature control signal TC is used in an additional controller of the furnace system to control the temperature of the heat chamber 3.

The overheat thermocouples 23 detect the temperature of the heat chamber 3 and output electromotive forces as electric signals when the furnace reaches an overheated state. In this case, the electric signals from the overheat thermocouples 23 are transmitted to the overheat controller 25. The overheat controller 25 generates an overheat control signal OHC. The overheat control signal OHC is used in another control system (not shown) of the furnace to interrupt the power.

As described above, it is difficult to detect the temperature of the reaction tube 1, since the reaction gas is deposited on the surface of the inner thermocouples 22 during the reaction process. Therefore, in an LPCVD process or in a low-pressure heat treatment process, the inner thermocouples 22 are only used to profile the temperature of the reaction tube 1 before the reaction gas is injected into the reaction tube, and are not used once the reaction process is started.

As described above, even though the spike thermocouples 21 are attached to the heat chamber 3, the spike thermocouples may be damaged and/or may be moved from an original position when the reaction tube 1 is inserted into the heating chamber 3 or the reaction tube 1 is withdrawn from the heating chamber 3. When the spike thermocouples 21 are damaged or moved from an original position, an accurate temperature measurement may not be achieved.

Therefore, the present invention uses the control switch 26 to connect output lines 28 of the overheat thermocouples 23 with output lines 27 of the inner thermocouples 22, when one or more of the spike thermocouples 21 becomes defective, either from being damaged or moved from an original position. As a result, it is possible to detect the furnace temperature accurately and to check whether there is an error in the temperature detected by the spike thermocouples 21.

When profiling temperature of the reaction tube 1, the inner thermocouples 22 are connected to the temperature controller 24 to detect the temperature inside the reaction tube. In this case, the control switch 26 is open to disconnect the output of the overheat thermocouples 23 from the output of the inner thermocouples 22. As a result, the overheat thermocouples 23 are not connected to the temperature controller 24. Thus, the overheat thermocouples 23 detect only the overheating state of the furnace.

When the reaction process is performed in the reaction tube 1, an inner thermocouple control switch 26a disconnects the inner thermocouples 22 from the temperature controller 24. The inner thermocouple control switch 26a is interposed between the output terminals of the inner thermocouples 22 and the connection point of the control switch 26 and the output lines 27 of the inner thermocouples 22. In this case, the control switch 26 is closed to connect the outputs of the overheat thermocouples 23 with both the overheat controller 25 and the temperature controller 24. Therefore, as the reaction process progresses in the reaction tube 1, the overheat thermocouples 23 not only interrupt the power of the furnace when the furnace overheats, i.e., reaches an overheated state, but also detect the temperature of the furnace when one or more of the spike thermocouples 21 become defective.

Figure 4:
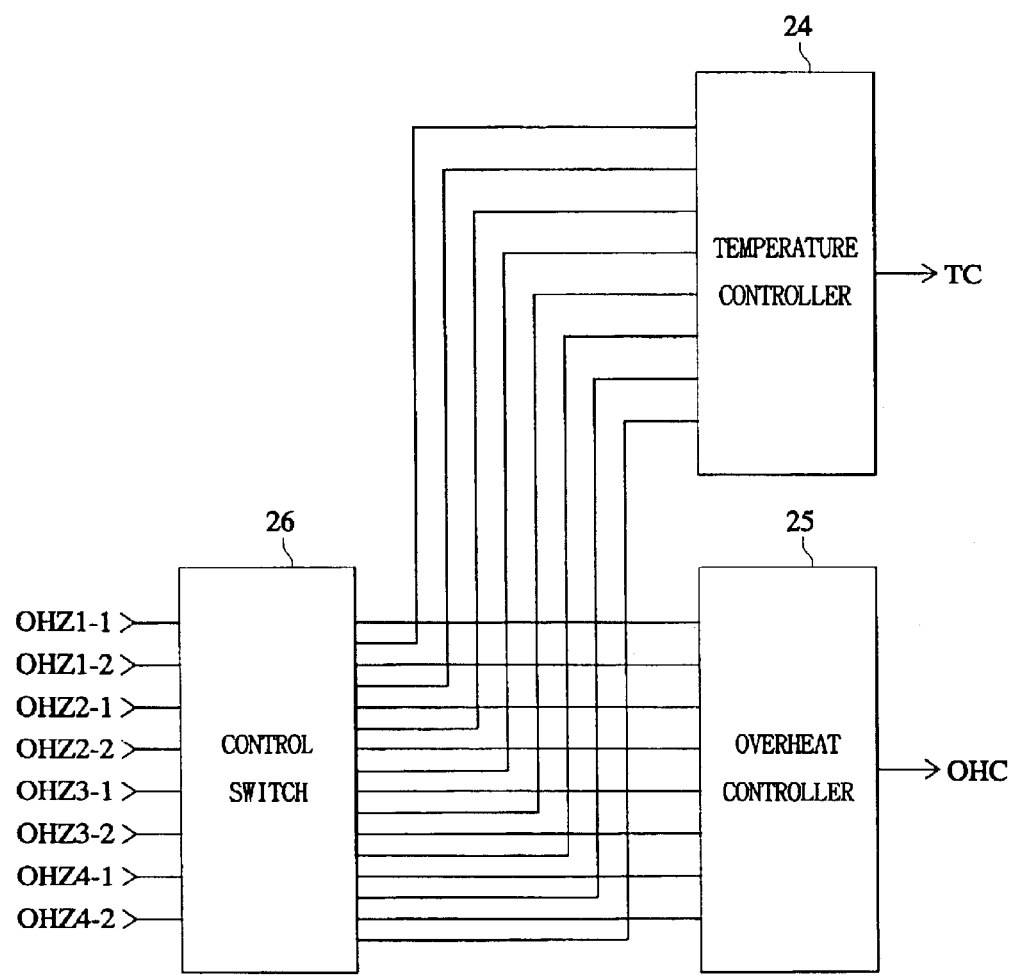
FIG. 4 is a block diagram illustrating a control switch according to an embodiment of the present invention.

FIG. 4 is a block diagram for illustrating the control switch of the furnace temperature detector according to an embodiment of the present invention. overheat controller 25 and a second group of eight output lines connected to the temperature controller 24. The output lines OHZ1-1 to OHZ4-2 of the overheat thermocouples are always connected to the first group of output lines, i.e., the overheat controller 25. The output lines OHZ1-1 to OHZ4-2 of the overheat thermocouples, however, are additionally connected to the second group of output lines, i.e., the temperature controller 24, only when the control switch 26 is closed.

When profiling the temperature of the reaction tube prior to initiating the reaction, the control switch 26 is open to disconnect the output lines OHZ1-1 to OHZ4-2 of the overheat thermocouples 23 from the temperature controller 24. When the reaction process is progressed in the reaction tube, the control switch 26 is closed to connect the outputs OHZ1-1 to OHZ4-2 of the overheat thermocouples 23 to the temperature controller 24.

As described above, the furnace temperature detector of the present invention is able to detect the furnace temperature using the overheat thermocouples when one or more of the spike thermocouples becomes defective.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A furnace temperature detector, comprising:

a spike thermocouple attached to a heating chamber;

an overheat thermocouple attached to the heating chamber;

an inner thermocouple installed inside a reaction tube surrounded by the heating chamber;

a temperature controller connected to an output line of the spike thermocouple and an output line of the inner thermocouple;

an overheat controller connected to an output line of the overheat thermocouple; and a control switch for directing the output line of the overheat thermocouple, wherein:

when the furnace is operating in an overheating state, the overheat thermocouple detects the overheating state of the furnace and generates and outputs an electric signal corresponding to the overheating state of the furnace to the overheat controller, and the overheat controller generates and outputs an overheat control signal; and when the furnace is operating without reaching the overheating state, the overheat thermocouple detects a furnace temperature and generates and outputs an electric signal corresponding to the furnace temperature to the control switch, the control switch directs the output line of the overheat thermocouple to the temperature controller, and the temperature controller generates and outputs a temperature control signal.

2. The furnace temperature detector according to claim 1, wherein the reaction tube and the heating chamber have multiple zones, and each zone has installed therein a spike thermocouple, an inner thermocouple, and an overheat thermocouple.

3. A furnace temperature detector, comprising:

a spike thermocouple for detecting a temperature of a heating chamber;

an inner thermocouple for detecting a temperature in a reaction tube surrounded by the heating chamber;

a temperature controller for receiving an electric signal from the spike thermocouple and the inner thermocouple, and for generating a temperature control signal;

an overheat thermocouple for detecting an overheating state of the heat chamber;

an overheat controller for receiving an electric signal from the overheat thermocouple, and for generating an overheat control signal; and a control switch for selectively outputting the electric signal from the overheat thermocouple or the electric signal from the inner thermocouple to the temperature controller depending on a process being performed, the control switch being interposed between an output line of the overheat thermocouple and an output line of the inner thermocouple.

4. The furnace temperature detector according to claim 3, wherein:

the control switch disconnects the output line of the overheat thermocouple from the output line of the inner thermocouple when profiling the temperature of the reaction tube; and the control switch connects the output line of the overheat thermocouple to the output line of the inner thermocouple when a reaction process is performed inside the reaction tube.

5. The furnace temperature detector according to claim 3, wherein the control switch is a relay switch.

6. A furnace temperature detector, comprising:

a spike thermocouple for detecting a temperature of a heating chamber;

an inner thermocouple for detecting a temperature in a reaction tube surrounded by the heating chamber;

a temperature controller for receiving an electric signal from the spike thermocouple and the inner thermocouple, and for generating a temperature control signal;

an overheat thermocouple for detecting an overheating state of the heat chamber;

an overheat controller for receiving an electric signal from the overheat thermocouple, and for generating an overheat control signal; and a control switch interposed between an output line of the overheat thermocouple and an output line of the inner thermocouple, wherein the control switch disconnects the output line of the overheat thermocouple from the output line of the inner thermocouple when profiling the temperature of the reaction tube; and the control switch connects the output line of the overheat thermocouple to the output line of the inner thermocouple when a reaction process is performed inside the reaction tube.

* * * * *